United States Patent [19]

Jee

[11] Patent Number: 5,349,283
[45] Date of Patent: Sep. 20, 1994

[54] AUTOMATIC VOLTAGE CONTROL CIRCUIT BY USING REACTIVE POWER

[75] Inventor: Kyung H. Jee, Daejeon, Rep. of Korea

[73] Assignee: SamSung Electronics Co., Ltd., Suweon, Rep. of Korea

[21] Appl. No.: 892,156

[22] Filed: Jun. 2, 1992

[30] Foreign Application Priority Data

Jul. 3, 1991 [KR] Rep. of Korea .................. 91-11258

[51] Int. Cl.$^5$ .............................................. G05F 1/70
[52] U.S. Cl. .................................. 323/207; 323/210; 323/211; 363/39; 307/105
[58] Field of Search ................. 363/39; 323/207, 210, 323/211; 307/105

[56] References Cited

U.S. PATENT DOCUMENTS

| | | | |
|---|---|---|---|
| 4,356,441 | 10/1982 | Putman et al. | 323/210 |
| 4,357,570 | 11/1982 | Schmid et al. | 323/210 |
| 4,472,674 | 9/1984 | Yano et al. | 323/210 |
| 4,625,161 | 11/1986 | Charles | 323/210 |
| 4,638,238 | 1/1987 | Gyugyi et al. | 323/211 |
| 4,719,402 | 1/1988 | Brennen et al. | 323/211 |
| 4,897,593 | 1/1990 | Konishi et al. | 323/210 |

*Primary Examiner*—Emanuel T. Voeltz
*Attorney, Agent, or Firm*—Ladas & Parry

[57] ABSTRACT

An automatic voltage control circuit by using reactive power is disclosed. The circuit comprises a proportional integrator, a triangular wave generator, a comparing circuit having first and second comparators, an inventer, and a reactive power control circuit, wherein the proportional integrator proportionally integrates the differences between output voltages and a reference voltage, the triangular wave generator outputs first and second triangular waves with a difference of phase angle 90°, the comparing circuit compares the output from the proportional integrator with the first and second triangular waves, the inverter controls the effective power by the output from the first comparator, and the reactive power control circuit controls the reactive power due to the variations of the load in response to the output from the second comparator, so that the output voltage can be maintained stably regardless of the variations of the load.

10 Claims, 5 Drawing Sheets

AUTOMATIC VOLTAGE CONTROL CIRCUIT BY USING REACTIVE POWER

FIELD OF THE INVENTION

The present invention relates to an automatic voltage control circuit for a large capacity AC power source facility and, particularly to an automatic voltage control circuit by using reactive power, in which a switching part is provided on an output terminal of an inverter, so when reactive power is generated excessively due to the variation of a load connected to the output terminal, the switching part is driven for always maintaining the output voltage at a constant level.

BACKGROUND OF THE INVENTION

The voltages are supplied through inverters to uninterrupted AC power supply apparatus, automatic AC voltage adjusting apparatus and AC motor control apparatus.

In the case where the AC power is supplied through the inverter, the power is provided with harmonics due to the characteristics of the inverter. Therefore, in the case of a large capacity-low frequency thyristor inverter of over 50 KVA, a ferro-resonant circuit has been provided on an output terminal of the inverter in order to adjust the voltage of the output terminal.

However, in the ferro-resonant circuit, inductors of the resonant circuit can be burned off by a large circulating current under a light load, and therefore, a separate cooling device has been used to prevent such a risk. However, it has still some problems because of low efficiency and low reliability, and malfunctions have been occurred frequently.

Further, in using the ferro-resonant circuit, there needs to keep inductors therein always for the ferro-resonance to prepare against the over-heating damage, and the inductor has to be replaced periodically, thereby causing many inconveniences.

SUMMARY OF THE INVENTION

The present invention is intended to overcome the above described disadvantages of the conventional techniques.

Therefore, it is an object of the present invention to provide an automatic voltage control circuit by using reactive power in which instead of employing the ferro-resonant circuit, a separate switching part and circuits for controlling this switching part are provided with a well-known impulse commutating type thyristor inverter in order to prevent unstable power outputs due to the variation of the reactive power in the conventional impulse commutating type thyristor inverter to supply stabilized output voltages.

According to the present invention, in order to achieve the above object, the automatic voltage control circuit, having a low-pass filter for filtering output voltages of an inverter and applying to load, comprises a proportional integrating circuit for integrating the difference between the output voltage and the reference voltage proportionally, a triangular wave output circuit for generating a first triangular wave a the second triangular wave having a phase difference of 90° each other, a comparing circuit for comparing the output from the proportional integrating circuit with the first and second triangular waves, an inverter for controlling effective power according to outputs from the first comparator of the comparing circuit, and a reactive power control circuit for controlling reactive power due to variations of the load according to outputs from the second comparator of the comparing circuit.

BRIEF DESCRIPTION OF THE DRAWINGS

The above object and other advantages of the present invention will become more apparent by describing in detail the preferred embodiment of the present invention with reference to the attached drawings, in which.

DESCRIPTION OF THE PREFERRED EMBODIMENT

The present invention employs the conventional impulse commutating type thyristor inverter, and the operation of the impulse commutating type thyristor inverter and the problems thereof will be described together with the solutions.

Figure 1:
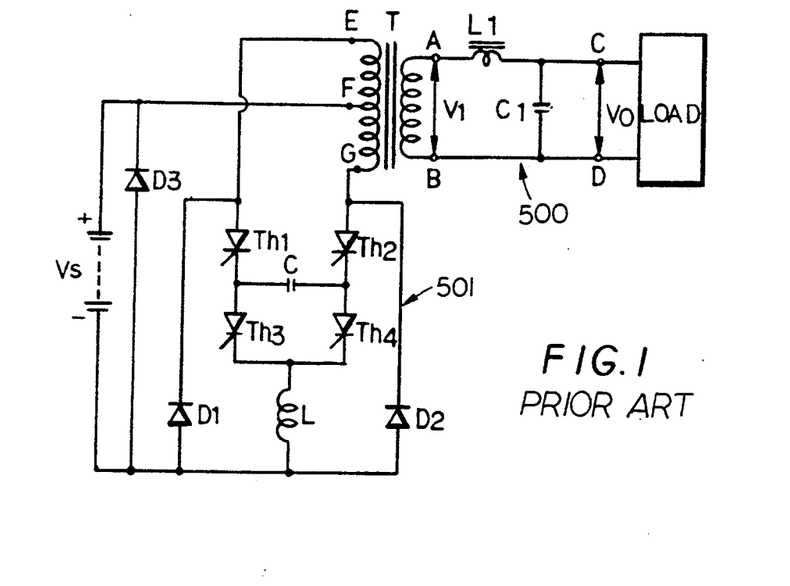
FIG. 1 illustrates a conventional impulse commutating type thyristor inverter circuit.

FIG. 1 is a circuit diagram of the impulse commutating type thyristor inverter 501 comprising a DC power source Vs, an insulated transformer T, thyristors Th1–Th4, diodes D1, D2, D3, capacitor C, a serial inductor L, and a low-pass filter 500.

Figure 2:
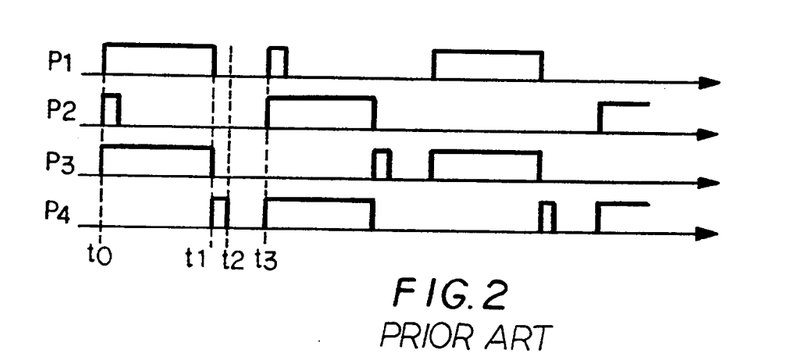
FIG. 2 illustrates waveforms of the driving signals for driving the conventional impulse commutating type thyristor inverter.

Now, the operation of this circuit will be described with reference to FIG. 2. FIG. 2 illustrates waveforms of pulses for driving the thyristors Th1–Th4. Pulse P1 drives the thyristor Th1, pulse P2 drives the thyristor Th2, pulse P3 drives the thyristor Th3, and pulse P4 drives the thyristor Th4.

When the thyristors Th1,Th2,Th3 are respectively driven by the pulses P1,P2,P3, the DC power source Vs is supplied from a positive terminal "+" through terminals F,E of the transformer T, the thyristor Th1,Th2,Th3 and the inductor L to the cathode "−" of the DC power source Vs.

Under this condition, a part of the DC power source Vs is charged through the thyristor Th2 to the capacitor C and, when its charged level attains to the double of the DC power source Vs, the thyristor Th2 is turned off. Further, at time t1, the thyristor Th4 is driven and the thyristor Th3 is turned off.

Therefore, a resonant current flows from the capacitor C through the thyristor Th4 and the inductor L to the diode D1 and increased energy is accumulated in the inductor L due to the increasing current.

If the resonant current is decreased from when the inter-terminal voltage of the inductor L becomes equal to negative DC voltage Vs, the energy accumulated in the inductor L is supplied through a secondary winding and the diode D3 to the positive terminal "+" of the DC power source Vs, thereby causing energy dissipation.

At time t2, all the thyristors Th1–Th4 are opened and at time t3, the thyristors Th1,Th2,Th3 are driven, so that the current can flow through terminals F,G of the transformer T, the thyristors Th2, Th4 and the inductor L to the negative terminal "−" of the DC power source VS, thereby reversing the direction of the output voltage from the secondary side of the transformer T. Under this condition, the conduction state of the thyristor Th2 for accumulating the commutated energy is turned to a naturally commutated state when the charged current of the commutating capacitor C drops to zero.

Figure 3:
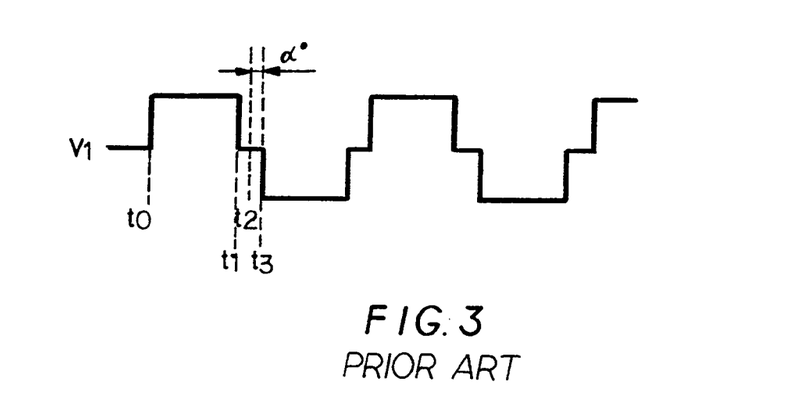
FIG. 3 illustrates waveforms of the output voltage of the conventional impulse commutating type thyristor inverter.

As shown in FIG. 3, the impulse commutating type thyristor inverter can control conduction delay angle of the thyristor and control the effective voltage value.

In order to form the voltage supplied to the load into a sine wave, a low pass filter comprises an inductor L1 and a capacitor C1 since the output from the impulse commutating type thyristor inverter contains a plurality of harmonic components.

Here, if a power factor (Cos θ) of the load is low, the reactive power is increased in the low pass filter compared with the power consumption of the load and, at the same time, the magnitude of the output power is increased and generates distorted voltage waves.

Figure 4A:
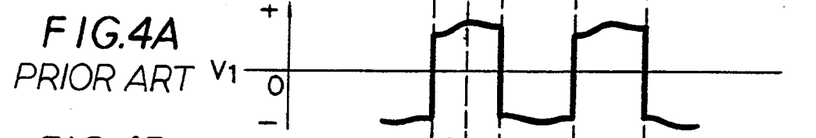
FIGS. 4A to 4C illustrate each waveform of voltage and current when reactive power in the conventional impulse commutating type thyristor inverter is increasing.
Figure 4B:
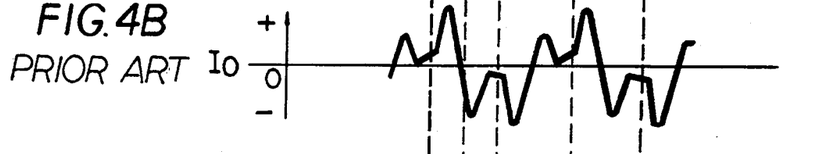

Due to the influence of such a reactive power, the output voltage from the secondary terminals of the transformer T becomes as shown in FIG. 4A, and the output current generates a waveform containing a lot of harmonic components compared with a frequency of a standard voltage as shown in FIG. 4B.

Figure 4C:
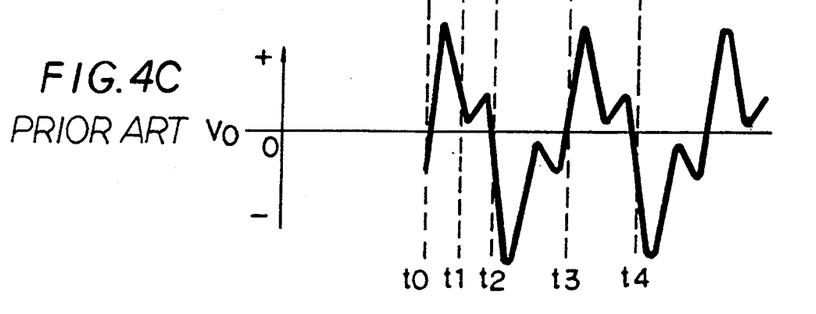

Further, the output voltage Vo shows a distorted waveform containing a lot of harmonic components as shown in FIG. 4C, and a voltage of the distorted waveform is supplied to opposite terminals of the load due to a quality factor and the reactive waveform of the low pass filter 500 500, which consists of the inductor L1 and the capacitor C1. Under this condition, maximum value Vm of an output voltage from the standard wave component supplied to the opposite terminals of the load is represented as follows:

$$Vm = \frac{4}{\pi} \cdot \frac{C}{L} \cdot V1 \cdot R0 \quad (1)$$

$$\left( W = \frac{1}{WC}, \frac{L}{C} > R0 \right)$$

where V1 represents terminal voltage of the secondary side of the transformer T and Ro represents an equivalent load resistance.

When an AC voltage expressed by Vo=Vm sin wt is supplied to the load terminals, if it is assumed that a current expressed by io=Im Sin(wt−θ) flows, then an instantaneous power P can be expressed by the voltage multiplied by the current as follows.

$$\begin{aligned} P &= Vo \times io = Vm \sin wt \times Im \sin(wt - \theta) \\ &= Vm\,Im \frac{\cos\theta - \cos(2wt - \theta)}{2} \\ &= \frac{VmIm}{2} \cos\theta - \frac{VmIm}{2} \cos(2wt - \theta) \end{aligned} \quad (2)$$

When the phase angle between voltage and current is θ, the AC instantaneous power can be expressed by the sum of a constant power having a value of $$\frac{VmIm}{2} \cos\theta$$

and a power having a value of $$-\frac{VmIm}{2} \times \cos(2wt - \theta),$$

which is variable to a double frequency according to time.

Therefore, as is apparent in the formula 1 above, the AC power varies according to the equivalent load resistance Ro and the time t, and the power P is instantaneous AC power.

According to formula 2 above, the instantaneous power P is expressed by the multiplication of the voltage by the current and the instantaneous power P is determined by the phase angle θ between the voltage and the current, where the phase angle θ is determined according to the magnitude and the kind of the load.

Therefore, the AC power can be obtained by taking the average value of each cycle (2π radians) of the instantaneous power of the formula 1.

The first term of the formula 2 is constant upon determination of the phase angle θ, and the second term has an average value 0 for each cycle because the power is varied to double frequency.

As shown in FIG. 4, the instantaneous powers from the time t0 to the time t1 and from the time t1 to the time t2 are offset each other, and therefore, the AC power is 0.

During the time span from the time t0 to the time t1, the power is supplied from the power source terminal to the load, and during the time span from the time t1 to the time t2, the power is recurred from the load to the power terminal.

Therefore, the output voltage not only produces the distorted waveform containing a lot of harmonic components, but also varies in a sensitive manner according to the variations of the magnitude of the load.

The present invention employs the above described impulse commutating type thyristor inverter wherein the reactive power recurred toward the power source during the time interval (t1~t2) as shown in FIG. 4 is controlled by the low pass filter, so that the voltage can be maintained constantly in spite of the variations of the load, and an output voltage close to a sine wave can be supplied to the load.

Figure 5:
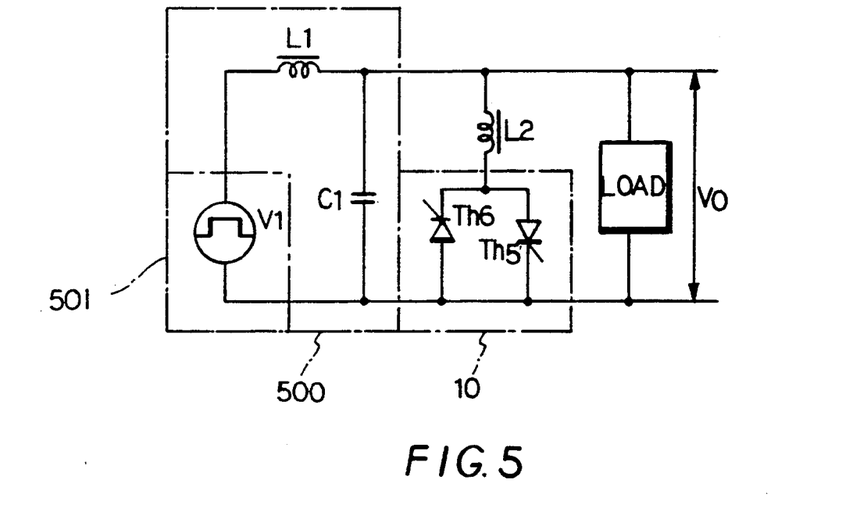
FIG. 5 is a circuit diagram of a switching part constructed according to the reactive power control type automatic voltage control circuit according to the present invention.

FIG. 5 illustrates a switching part 10 of the automatic control circuit by using the reactive power according to the invention.

Before the voltage V1 supplied from the conventional impulse commutating type thyristor inverter is supplied to the load, the voltage V1 is filtered by the low-pass filter 500 consisting of the inductor L1 and the capacitor C1, and then, the voltage is supplied to the load. However, in order to control the reactive power against the variations of the load, the present invention employs the switching part 10 consisting of thyristors Th5, Th6.

Figure 6:
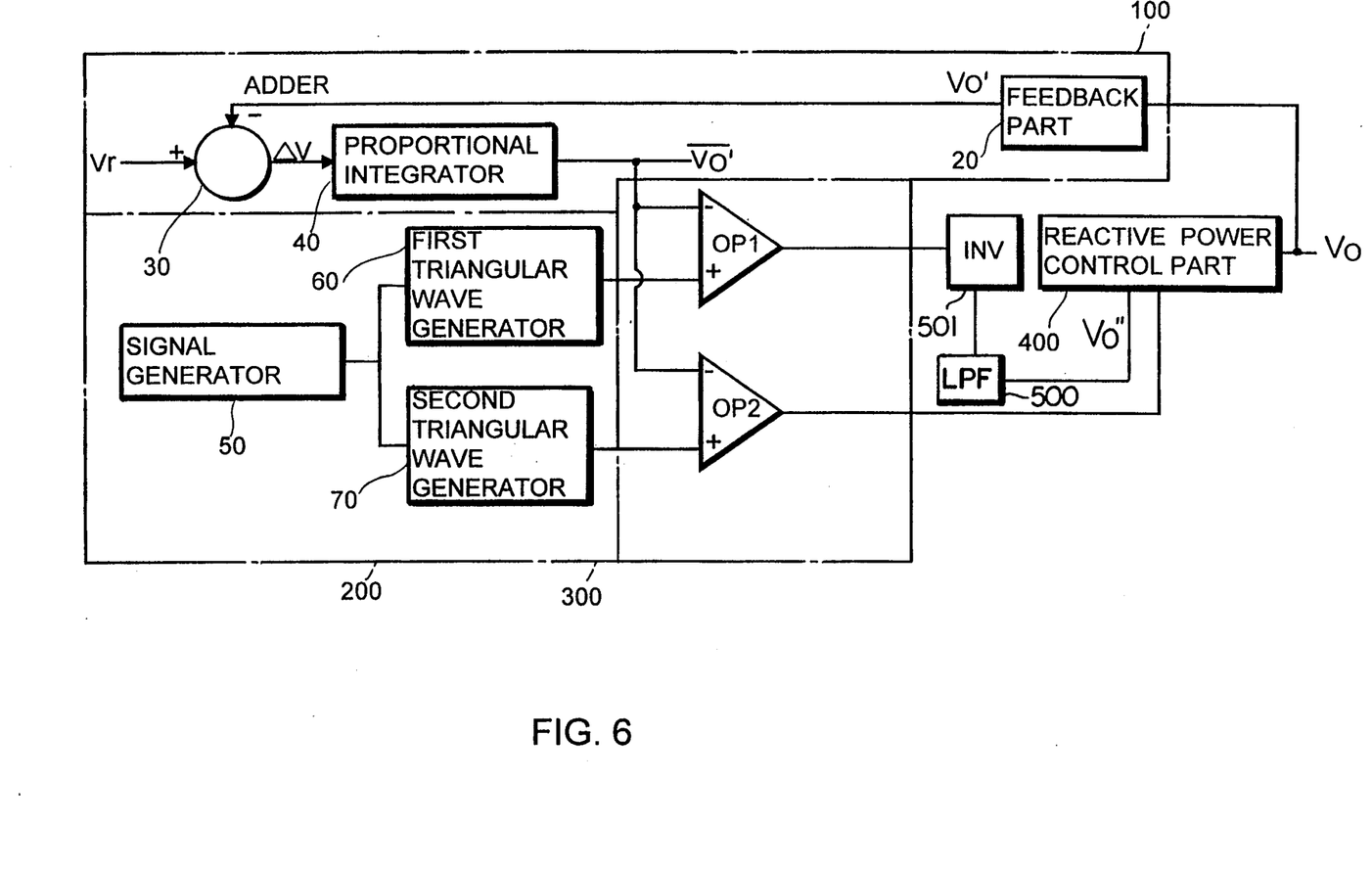
FIG. 6 is block diagram of the reactive power control type automatic voltage control circuit of the present invention.

FIG. 6 is a block diagram showing the reactive power control type automatic voltage control circuit according to the present invention, and this circuit controls the reactive power by controlling the switching part 10 and the impulse commutating type thyristor inverter.

The reactive power control type automatic voltage control circuit according to the present invention includes a proportional integrator 100, a triangular wave generator 200, a comparing circuit 300, a reactive power controlling circuit 400, a conventional impulse commutating type thyristor inverter 501 also FIG. 1 and also called "inverter" below) and a low-pass filter 500.

Specifically, the proportional integrator 100 carries out proportional integrations on the difference between a reference voltage Vr and an output voltage Vo provided from the reactive power control circuit 400. This circuit 100 includes an adder 30 provided with a feed back part 20 for feeding back the output from reactive power control circuit 400. The reference voltage Vr is supplied to the adder 30, so that the adder 30 can output a difference ($\Delta V$) between the reference voltage Vr and the output voltage Vo' of the feed back part 20. The output voltage ($\Delta V$) from the adder 30 of the proportional integrating circuit 100 is supplied to a proportional integrator 40.

The triangular wave generating circuit 200 comprises a signal generator 50 for generating sinusoidal waves having a predetermined width, and first and second triangular wave generators 60, 70 for converting the sinusoidual waves to triangular waves to generate first and second triangular waves.

The first and second triangular wave generators 60, 70 are connected to the signal generating part 50 and the first traingular wave provided from the first triangular wave generator 60 precedes by 90° that of the second triangular wave generator 70.

The comparing circuit 300 compares an output from the proportional integrating circuit 100 with the first and second triangular waves, and comprises a first comparator OP1, connected to the proportional integrator 40 and the first triangular wave generator 60 and a second comparator OP2 connected to the proportional integrator 40 and the second triangular wave generator 70.

The inverter 501 is constructed in a same manner as the conventional one of FIG. 1, but its conduction delay angle "$\alpha$" is controlled according to an the output from the first comparator OP1, so that the output apparent power can be controlled.

The reactive power control circuit 400 controls the reactive power caused by the variations of the load according to an output from the second comparator OP2, and comprises a switching output part 80 (FIG. 8) for generating first and second switching signals the polarity of the output voltage Vo and the output from the second comparator OP2, and a switching part 10 (FIGS. 5 and 8) for controlling the output voltage according to the first and second switching signals.

Figure 8:
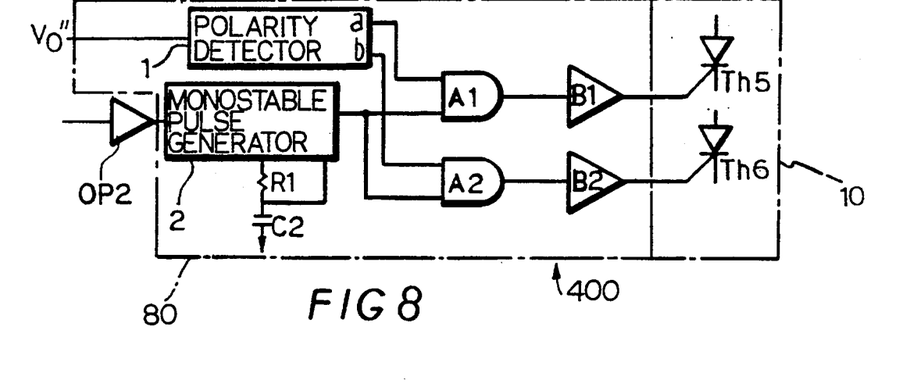
FIG. 8 is a block diagram of a signal output part and a switching part in the reactive power control type automatic voltage control circuit according to the present invention.

The above components will be described in more detail. The switching signal generator 80 comprises a monostable pulse generator 2 connected to the second comparator OP2 for generating sinusoidal waves according to the output from the second comparator OP2. The sinusoidal waves generated by the monostable pulse generator 2 had a width corresponding to time constants of a resistor R1 and the capacitor C2.

The switching signal generator 80 further comprises a polarity detector 1 connected to the output terminal of FIG. 5. The polarity detector 1 outputs high level logics through a terminal "b" under the negative polarity of the voltage of the output terminal, and through a terminal "a" under the positive polarity of the voltage of the output terminal.

The monostable pulse generator 2 and the polarity detector 1 of the switching signal generator 80 are respectively connected to AND gates A1, A2, so that the AND gates A1, A2 can provide high level logics according to the outputs from the monostable pulse generator 2 and the polarity detector 1.

Further, as shown in FIG. 5, the switching part 10 comprises thyristors Th5, Th6 connected to the output terminal for being driven by the output from the switching signal generator 80.

Reference symbols B1, B2 are buffers, and the second comparator OP2 does not belong to the switching signal generator 80, but is illustrated therewith for the sake of explaining.

The automatic voltage control circuit by using reactive power of the present invention constructed as above will now be described in more detail as to its operations referring to FIG. 7.

Triangular pulse P5 is output from the first triangular pulse generator 60, pulse P6 is output from the inverter 500, and triangular pulse P7 is output from the second triangular pulse generator 70.

Pulse P8 is a waveform of a voltage supplied to the positive terminals and negative terminals of the thyristors Th5, Th6, and pulse P9 is a waveform of a voltage supplied to the load. Pulse P10 is a voltage wave to be supplied through the AND gate A1 to the thyristor Th5, and pulse P11 is a waveform of a driving signal voltage to be supplied through the AND gate A2 to the thyristor Th6.

First, under a normal state of the load, the output voltage supplied to the load is transferred through the feedback part 20 to the adder 30 in the form of a feedback voltage Vo'.

Since the adder 30 has already been keeping the reference voltage Vr, the difference voltages ($\Delta V$) between the feed back voltage Vo' and the reference voltage Vr are subjected to a proportional integration by the proportional integrator 40. However, when the feed back voltage Vo' is in a normal state, the level of the difference voltages ($\Delta V$) is higher than the triangular waves of the first and second triangular generators 60, 70 so that the first and second comparators OP1, OP2 can output low level logics.

The low level logics of the first comparator OP1 can not affect the inverter 501 so that the inverter 501 can maintain the conduction delay angles of the thyristors Th1–Th4, and output effective powers continuously. Further, low level logics output from the second comparator OP2 can not affect the monostable pulse generator 2 so that the output can be kept at a low level.

Therefore, the AND gates A1, A2 are maintained at the low level logics, so that the AND gates A1, A2 can output low level logics, thereby turning off the thyristors Th5, Th6.

Such a turned-off state of the thyristors Th5, Th6 assures that the output voltage Vo is supplied continuously from the inverter 501 to the load. Under this condition, the voltage supplied to the thyristors Th5, Th6 can keep a sine waveform like the pulse P8 so that the output voltage Vo can have the sine wave form like the pulse P9.

Figure 7:
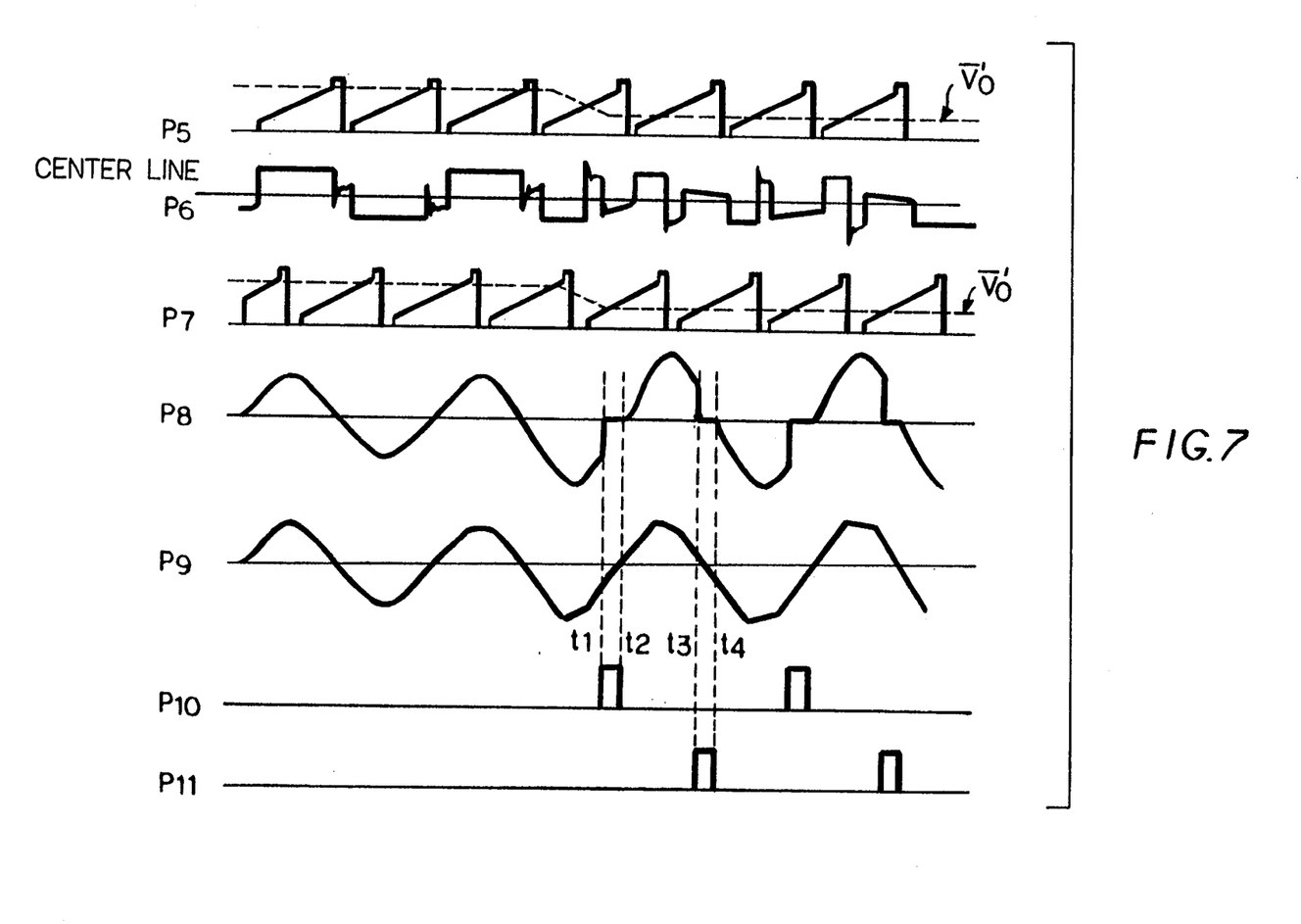
FIG. 7 illustrates each waveform of major portions of the automatic voltage control circuit according to the present invention.

However, if the output voltage Vo is increased correspondingly to the increase of the reactive power due to the variations of the load, the output voltage $\overline{Vo}'$ from the proportional integrator 40 becomes lower than the first and second triangular pulses P5, P6 as shown by the dotted lines in FIG. 7.

Under this condition, the first comparator OP1 recognizes that the first triangular wave is lower than the voltage Vo' and supplies a high level logic to the inverter 501, so that the conduction delay angle a of the thyristors Th1~Th4 can be enlarged and decrease the effective power.

Meanwhile, the second comparator OP2 compares the output voltage Vo' from the proportional integrator 40 with the output from the second triangular wave generator 70 having a phase angle lagging by 90° behind the first triangular wave P6, and outputs driving signals P10, P11 for the switching signal generator 80. The driving signals P10, P11 from the second comparator OP2 are supplied to the monostable pulse generator 2, and the monostable pulse generator 2 outputs proper spherical waves according to the time constants of the capacitor C2 and the resistor R1.

The polarity detector 1 detects a negative polarity for the output voltage Vo at the time t1 to supply a high level logic through a terminal "b" to the second AND gate A2. Then the second AND gate A2 receives the high level logics from the polarity detector 1 and the monostable pulse generator 2, and supplies the high level logics to a thyristor Th6. Accordingly, the thyristor Th6 is rendered conductive, so that the reactive power increasing due to the variations of the load can be fed back through the thyristor Th6 and the inductor L2, for controlling the magnitude of the output voltage P9.

On the other hand, if the output voltage Vo is positive, the polarity detector 1 supplies a high level logic through the terminal "a" to the AND gate A1, so that a driving signal equal to the pulse P11 can be supplied to the thyristor Th5.

Thus, the reactive power due to the variations of the load goes back through the thyristors Th5, Th6 and the reactor L3, so that the effective value of the output voltage Vo can be maintained constantly.

Figure 9A:
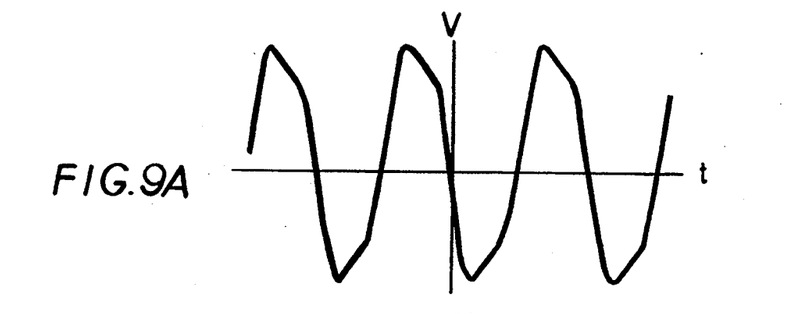
FIGS. 9A–9C illustrate waveforms of the output voltage obtained by the reactive power control type automatic voltage control circuit according to the present invention.
Figure 9B:
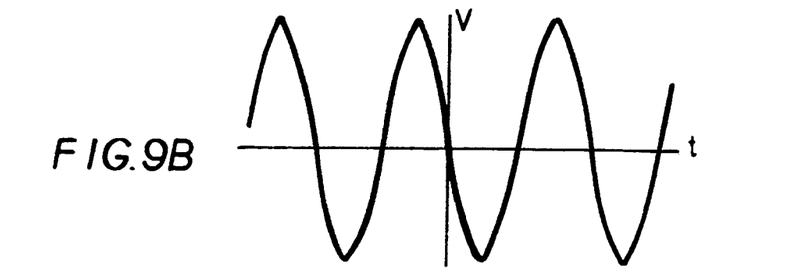
Figure 9C:
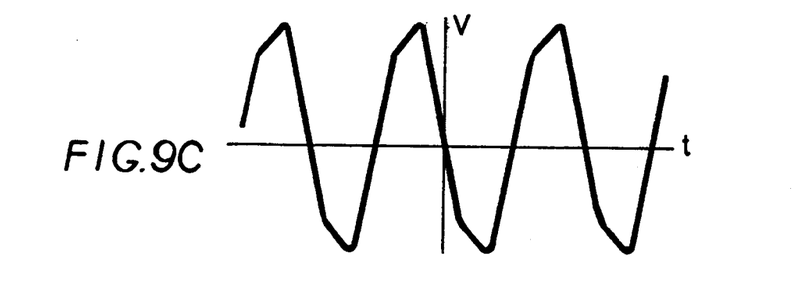

FIG. 9 illustrates waveforms to be obtained through an actual experiment, wherein FIG. 9A illustrates a waveform of an output voltage under a minimum load condition, FIG. 9B illustrates a waveform of an output voltage under one half load condition, and FIG. 9C illustrates a waveform of an output voltage under a maximum load condition.

According to the present invention as described above, the reactive power due to the variations of the load is detected by means of a proportional integrating circuit, and the switching part is driven according to the magnitude of the reactive power, so that the output voltage can be maintained stably regardless of the variations of the load. Further, the large circulating current flowing through the low-pass filter under a light load is limited, so that the burning or damage due to the inductor current can be prevented.

What is claimed is:

1. An automatic voltage control circuit by using reactive power including inverter output adjusting means having a low-pass filter for filtering output voltage of said inverter to supply to a load, said automatic voltage control circuit comprising:

proportional integrator means for proportionally integrating difference between an output voltage and a reference voltage;

triangular wave generator means for generating a first triangular wave and a second triangular wave with a difference of a phase angle 90° ;

comparing means having a first comparator and a second comparator for comparing an output from said proportional integrator means with said first and second triangular waves;

inverter means for controlling effective power according to an output from said second first comparator; and reactive power control means connected to said comparing means for controlling reactive power due to variations of said load according to an output from said comparator.

2. The automatic voltage control circuit as claimed in claim 1, wherein said proportional integrator means comprises:

feedback means for feeding back an output voltage from said reactive power control means;

adder means for calculating a difference between said reference voltage and an the output voltage from said feedback means; and proportional integrator means for proportionally integrating an output from said adder.

3. The automatic voltage control circuit as claimed in claim 1, wherein said comparing means comprises:

a first comparator for comparing said triangular waves from said triangular generator means with the output from said proportional integrating circuit; and a second comparator for comparing said second triangular waves from said triangular wave generator means with the output from said proportional integrating circuit.

4. The automatic voltage control circuit as claimed in claim 1, wherein said reactive power control circuit comprises:

switching signal generating means for generating a first switching signal and a second switching signal according to polarities of said second comparator and said output voltage; and switching means for controlling said output voltage according to said switching signals.

5. The automatic voltage control circuit as claimed in claim 4, wherein said switching signal generating means comprises:

a monostable pulse generator for generating pulses having a predetermined width according to an output from said first comparator; and a first AND gate and a second AND gate for combining outputs from said polarity detector and said monostable pulse generator.

6. The automatic voltage control circuit as claimed in claim 4, wherein said switching means comprises a first thyristor and a second thyristor to be driven according to outputs from said first and second AND gates for controlling an output voltage from said inverter to said load.

7. The automatic AC output voltage control circuit comprising:

an impulse commutating-type thyristor inverter for converting a supplied DC voltage into an AC output voltage;

a reactive power control means comprising polarity detector means for providing first and second logic signals in respective response to polarities of the AC output voltage, a monostable pulse generator responsive to the second output voltage for providing a third logic signal, AND gates respectively responsive to the first and third and second and third logic signals and switching means respectively responsive to the AND gates for oppositely shunting the AC output voltage; and a feedback means comprising, proportional integrator means responsive to the AC output voltage and a reference voltage for providing the second output voltage, triangular wave generator means for producing a first triangular wave and a second triangular wave that lags 90° in phase from the first triangular wave and comparing circuit means responsive to the second output voltage and the first and second triangular waves for controlling the inverter and reactive power control means.

8. The automatic AC output voltage control circuit according to claim 7, and further comprising a low pass filter for filtering the AC voltage from the inverter to the reactive power control means.

9. The automatic AC output voltage control circuit according to claim 7, wherein the porportional integrator means comprises:

output voltage feedback means for feeding back a third output voltage part of the AC output voltage;

an adder for adding a reference voltage to the third output voltage; and proportional integrator means for integrating the third output voltage into the second output voltage.

10. The automatic AC output voltage control circuit according to claim 7, wherein the comparing circuit means comprises:

a first comparator responsive to the second output voltage and the first triangular wave for controlling the inverter; and a second comparator responsive to the second output voltage and the second triangular wave for controlling the reactive power control means.

* * * * *